United States Patent
Tehrani et al.

(10) Patent No.: US 7,143,202 B2
(45) Date of Patent: Nov. 28, 2006

(54) DUAL SERIAL PORT DATA ACQUISITION INTERFACE ASSEMBLY FOR A DATA STORAGE DEVICE

(75) Inventors: Bijan Tehrani, Shrewsbury, MA (US); Arthur J. Clark, Oklahoma City, OK (US); Paul M. Hardy, Oklahoma City, OK (US)

(73) Assignee: Seagate Technology LLC, Scotts Valley, CA (US)

(*) Notice: Subject to any disclaimer, the term of this patent is extended or adjusted under 35 U.S.C. 154(b) by 697 days.

(21) Appl. No.: 10/000,626

(22) Filed: Oct. 30, 2001

(65) Prior Publication Data

US 2003/0005188 A1    Jan. 2, 2003

Related U.S. Application Data

(60) Provisional application No. 60/302,530, filed on Jul. 2, 2001.

(51) Int. Cl.
*G06F 3/00* (2006.01)

(52) U.S. Cl. ............... 710/15; 710/18; 710/20; 710/71; 710/74; 714/47; 702/182; 702/186

(58) Field of Classification Search ............ 710/15–19, 710/72–74; 714/47
See application file for complete search history.

(56) References Cited

U.S. PATENT DOCUMENTS

| | | | |
|---|---|---|---|
| 4,417,320 A | 11/1983 | Ei | |
| 4,450,572 A | 5/1984 | Stewart et al. | |
| 4,509,139 A | 4/1985 | Creager, Sr. | |
| 4,533,958 A | 8/1985 | Herget | |
| 4,637,012 A * | 1/1987 | Crabbe, Jr. | 370/276 |
| 4,641,263 A | 2/1987 | Perlman et al. | |
| 4,979,055 A * | 12/1990 | Squires et al. | 360/69 |
| 5,298,647 A | 3/1994 | Robert et al. | |
| 5,323,272 A | 6/1994 | Klingler | |
| 5,367,394 A * | 11/1994 | Chuter et al. | 398/33 |
| 5,404,504 A | 4/1995 | Byers et al. | |
| 5,412,666 A * | 5/1995 | Squires et al. | 714/755 |
| 5,414,814 A | 5/1995 | McKim | |
| 5,422,760 A | 6/1995 | Abbott et al. | |
| 5,594,600 A * | 1/1997 | Bruner et al. | 360/69 |
| 5,726,821 A | 3/1998 | Cloke et al. | |
| 5,826,093 A * | 10/1998 | Assouad et al. | 712/43 |
| 5,884,202 A | 3/1999 | Arjomand | |
| 5,986,841 A | 11/1999 | Sorenson | |
| 5,987,542 A | 11/1999 | Bang | |
| 6,023,587 A | 2/2000 | Watts, Jr. et al. | |
| 6,035,345 A * | 3/2000 | Lee | 710/8 |
| 6,075,663 A | 6/2000 | Chae | |
| 6,094,609 A | 7/2000 | Arjomand | |
| 6,178,057 B1 * | 1/2001 | Kuroda et al. | 360/51 |

(Continued)

*Primary Examiner*—Kim Huynh
*Assistant Examiner*—Eron Sorrell
(74) *Attorney, Agent, or Firm*—Fellers, Snider, et al.

(57) ABSTRACT

A dual serial port data acquisition interface assembly including a printed circuit board for supporting additional components of the dual serial port assembly, a personal computer peripheral component interconnect connector secured to the printed circuit board for passing data between the printed circuit board and a personal computer. A first serial port connector mounted on the printed circuit transferring communication data and synchronization data between the personal computer and the data storage device through a programmed universal asynchronous receiver/transmitter microchip, and a second serial port connector mounted on the printed circuit board passing a performance data of the servo control circuit from the data storage device through a serial-to-parallel converter to the personal computer.

18 Claims, 4 Drawing Sheets

U.S. PATENT DOCUMENTS 6,270,415 B1   8/2001   Church et al.
6,295,566 B1   9/2001   Stufflebeam
6,457,083 B1 *  9/2002  Schober et al. ............. 710/305
2002/0081873 A1 *  6/2002  Harris et al. .................. 439/79

* cited by examiner

DUAL SERIAL PORT DATA ACQUISITION INTERFACE ASSEMBLY FOR A DATA STORAGE DEVICE

RELATED APPLICATIONS

This application claims priority to U. S. Provisional Application No. 60/302,530 filed Jul. 2, 2001, entitled DUAL SERIAL PORT REAL-TIME PCI DATA ACQUISITION INTERFACE.

FIELD OF THE INVENTION

This invention relates generally to the field of magnetic data storage devices, and more particularly, but not by way of limitation, to a dual serial port data acquisition interface for a data storage device.

BACKGROUND

Data storage devices are used for data storage in modern electronic products ranging from digital cameras to computer systems and networks. A typical data storage device includes a head-disc assembly (HDA), housing the mechanical portion of the data storage device, and a printed circuit board assembly (PCBA) attached to the head-disc assembly, for controlling operations of the head-disc assembly and providing a communication link between the data storage device and its host.

Typically, a head-disc assembly comprises a recording surface on a disc affixed to a spindle motor assembly for rotation at a constant speed and an actuator assembly positionably controlled by a closed loop servo system. The actuator assembly supports a read/write head that traverses a plurality of radially spaced, generally concentric information tracks on the recording surface. Data storage devices using magneto resistive read/write heads typically use an inductive element, or writer, to write data to the information tracks and a magneto resistive element, or reader, to read data from the information tracks during data storage device operations.

One type of data recorded to and read from the information tracks is servo data. Servo data, including a physical track identification portion (also referred to as a servo track number or physical track number), is written to the recording surface to define each specific physical track written on the recording surface. Typically a servo track writer is used in writing a predetermined number of physical tracks, also referred to as servo tracks, to each recording surface during the manufacturing process for use by the closed loop servo system in controlling the position of the read/write head relative to the recording surface during operation of the data storage device.

High performance data storage devices of the present generation typically achieve areal bit densities measured in several gigabits per square centimeter, Gbits/cm$^2$. Higher recording densities can be achieved by increasing the number of bits stored along each information track, or bits per inch (BPI), and by increasing the number of information tracks provided per unit width, or tracks per inch (TPI), across each recording surface. Increased BPI generally requires improvements in the read/write channel electronics to enable the data to be written (and subsequently read) at a correspondingly higher frequency. Higher TPI generally requires improvements in servo control systems to enable the read/write heads to be more precisely positioned relative to the information tracks.

To facilitate improvements in servo control systems, and to prepare for high volume data storage device manufacturing, the servo system of the data storage device needs to be characterized, and its operating points defined. However, the servo system is complex and requires real time interface capability to fully identify, evaluate and test weaknesses, and strengths. The need for a real time interface poses a challenging problem. Typical interfaces provided for the user (SCSI, ATA, and Fiber Channel) do not yield the required bandwidth (data rate) to accomplish the task. These interfaces provide limited visibility and interaction with the servo microprocessor and application specific integrated circuits (ASIC).

Therefore, challenges remain and a need persists for methods and test systems for measuring the attributes, boundaries and operational characteristics of present generation servo systems on a real time basis. A measured response of the servo control circuit to the combination of factors, along with a characterization of specific limitations of the servo control circuit system, are key pieces of information needed to develop manufacturing test regimens for both present and future generation data storage devices.

An ability to measure, map and diagnose the attributes of the servo system in a data storage device, in real time, holds the capability of developing more efficient and focused manufacturing test systems for improved control over the data storage device manufacturing process. It is to this and other features and advantages set forth herein that embodiments of the present invention are directed.

SUMMARY OF THE INVENTION

Embodiments of the present invention address some of the difficulties and problems discussed above, by providing a dual serial port data acquisition interface assembly for characterizing a servo control circuit of a data storage device. The dual serial port data acquisition interface assembly includes a printed circuit board for supporting various components of the dual serial port assembly. Included among those components are a personal computer peripheral component interconnect connector for passing data between the printed circuit board and a personal computer, a first serial port connector mounted on the printed circuit board transferring communication and synchronization data between the personal computer and the data storage device through a programmed universal asynchronous receiver/transmitter microchip, and a second serial port connector mounted on the printed circuit board passing performance data of the servo control circuit from the data storage device through a serial-to-parallel converter to the personal computer for analysis by the personal computer.

These and various other features and advantages which characterize the present invention will be apparent from a reading of the following detailed description and a review of the associated drawings.

DETAILED DESCRIPTION

Figure 1:
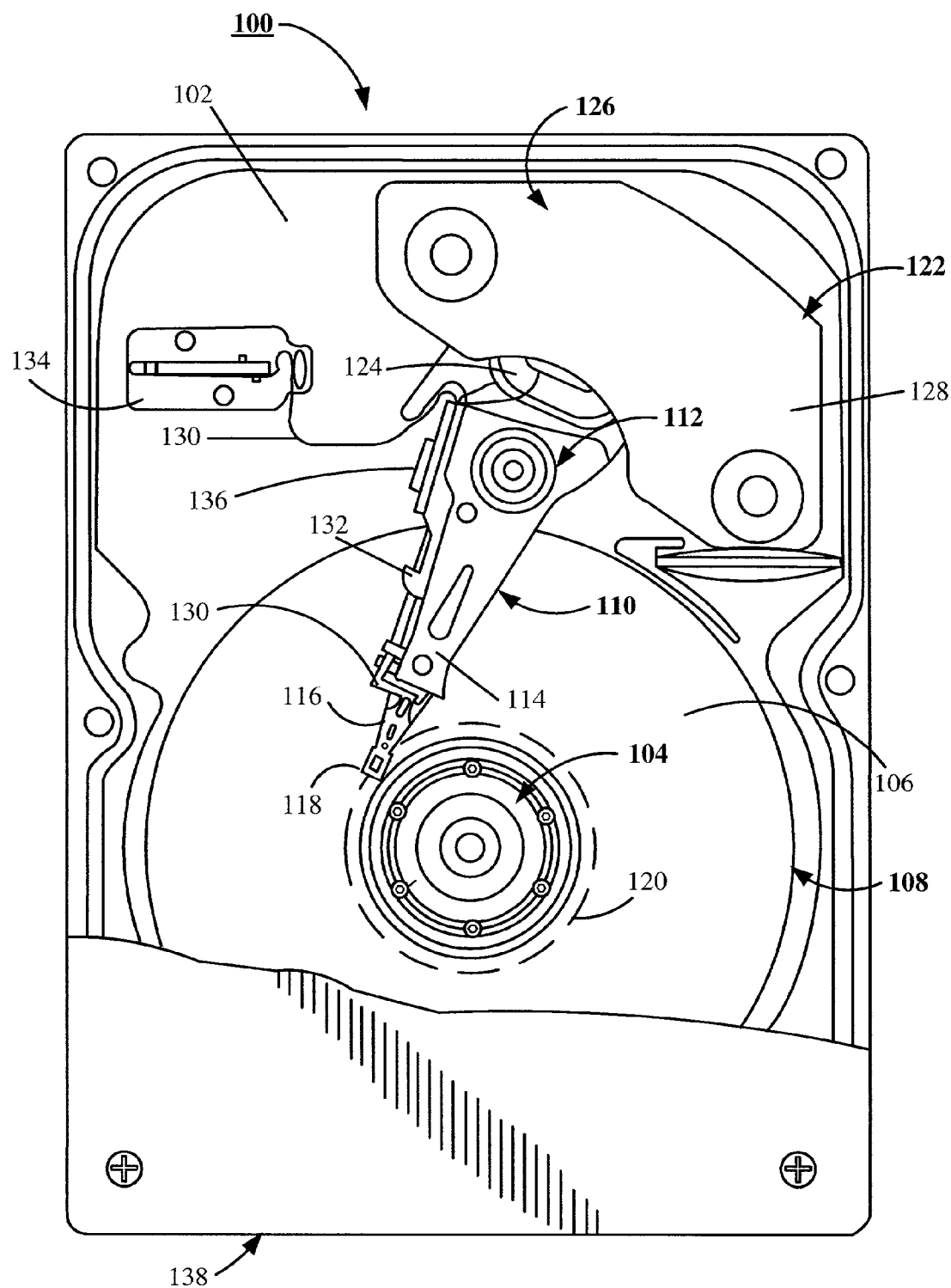
FIG. 1 is a partial cutaway top plan view of a data storage device with a servo control circuit characterized by a dual serial port data acquisition interface assembly.

Referring to the drawings in general, and more particularly to FIG. 1, depicted therein is a top view of a data storage device 100 having a cover partially removed to display the components thereof. The data storage device 100 is also sometimes referred to as disc drive 100 and is constructed in accordance with the present invention. Numerous details of and variations for the construction of the data storage device 100 are not included in the following description, which, are well-known to those skilled in the art, and believed unnecessary for the purpose of describing the present invention.

The data storage device 100 includes a basedeck 102 supporting various data storage device components, including a spindle motor assembly 104 supporting an axially aligned rotatable recording surface 106 and forming a disc stack 108.

Adjacent the disc stack 108 is an actuator assembly 110 also referred to as a head stack assembly (HSA), which pivots about a bearing assembly 112 in a rotary fashion. The head stack assembly 110 includes an actuator arm 114 that supports a load arm 116, which in turn supports a read/write head 118 corresponding to the rotatable recording surface 106.

The rotatable recording surface 106 is divided into a plurality of concentric information tracks 120 (also known as data tracks 120 only one of which is depicted) over which the read/write head 118 is positionably located. The information tracks 120 are caused to contain head position control information written to embedded servo sectors (not separately depicted). Between the embedded servo sectors are data sectors used for storing bit patterns or data (not separately depicted). The read/write head 118 includes a read element or reader offset radially and laterally from a write element or writer (neither separately depicted).

During write operations of the data storage devices 100, the writer writes data to the concentric information tracks 120, while the reader controls the positioning of the read/write head 118 relative to the concentric information track 120. During read operations of the data storage devices 100, the reader controls the positioning of the read/write head 118 relative to the concentric information track 120 being read and reads the information thereon.

The term "servoing," also referred to as position-controlling as used herein, means maintaining control of the read/write head 118 relative to the rotating recording surfaces 106 during operation of the data storage device 100. Servoing to or on a selected information track 120, the head stack assembly 110 is controllably positioned by a primary actuator motor 122 (also referred to as a voice coil motor assembly, VCM). The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122.

During operation of the data storage device 100, current is passed through the actuator coil 124 forming an electromagnetic field which interacts with the magnetic circuit of the voice coil motor 122, causing the actuator coil 124 to move relative to the magnet assembly 126. As the actuator coil 124 moves, the head stack assembly 110 pivots about the bearing assembly 112, causing the head 118 to move over the rotatable recording surface 106, thereby enabling the head 118 to interact with the information tracks 120 of the recording surfaces 106.

To provide the requisite electrical conduction paths between the read/write head 118 and read/write circuitry of the data storage device 100, read/write head wires (not depicted) of the read/write head 118 are affixed to a read/write flex circuit 130. The read/write flex circuit 130 is routed from the load arms 116 along the actuator arms 114 and into a flex circuit containment channel 132. The read/write flex circuit 130 is secured to a flex connector body 134. The flex connector body 134 supports the read/write flex circuit 130 during passage of the read/write flex circuit 130 through the basedeck 102 and into electrical communication with a printed circuit board assembly (PCBA not depicted). The printed circuit board assembly is mounted to the underside of the basedeck 102.

The flex circuit containment channel 132 also supports read/write signal circuitry including a preamplifier/driver (preamp) 136 used to condition read/write signals passed between the read/write circuitry (not depicted) and the read/write head 118. The printed circuit board assembly provides the data storage device 100 with read/write circuitry, which controls the operation of the head 118, as well as other interface and control circuitry for use by the data storage device 100 in controlling data storage device operations and communicating with its host.

The data storage device 100 has two primary assemblies, the PCBA (not depicted) and a head disc assembly (HDA) 138 attached to the PCBA. Typically, included within the head disc assembly 138 are the head stack assembly 110, the voice coil motor 122 and the disc stack 108.

Figure 2:
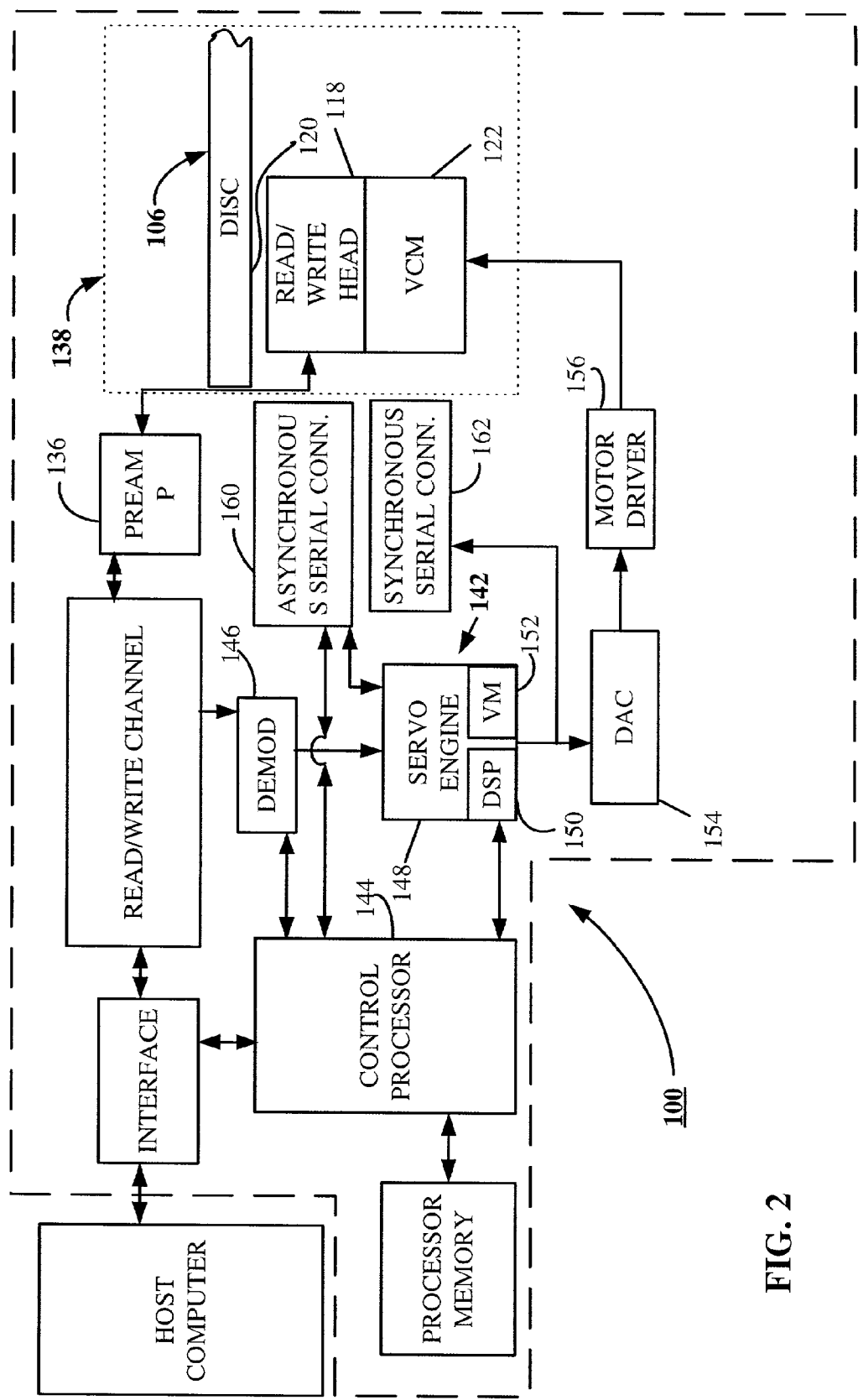
FIG. 2 is a functional block diagram of control circuitry of the data storage device of FIG. 1.

Turning to FIG. 2, position-controlling of the read/write head 118 is provided by the positioning mechanism (not separately depicted) operating under the control of servo control circuit 142 programmed with servo control code, which forms the servo control loop. The servo control circuit 142 typically may include a control processor 144, a demodulator (demod) 146, an application specific integrated circuit (ASIC) hardware-based servo controller ("servo engine") 148, a digital signal processor (DSP) 150, a volatile memory (VM) 152, a digital to analog converter (DAC) 154 and a motor driver circuit 156.

Optionally, the functions of servo engine 148, DSP 150 and volatile memory 152 may all be contained within the control processor 144. The components of the servo control circuit 142 utilize track following algorithms to effect control of the head stack assembly 110 (FIG. 1) and more specifically for controlling the voice coil motor 122 in position-controlling the read/write head 118 relative to the selected information track 120 (FIG. 1).

The demodulator 146 conditions head position control information transduced from the information track 120 of the rotatable recording surface 106 to provide position information of the read/write head 118 relative to the information track 120 (FIG. 1). The servo engine 148 generates servo control loop values used by control processor 144 in generating command signals used by the voice coil motor 122 in executing seek commands, and in executing track following commands during data transfer operations. The command signals generated by the control processor 144 are converted by the digital to analog converter 154 to analog control signals for use by the motor driver circuit 156 in position-controlling the read/write heads 118 relative to the selected information track 120 during track following, and relative to the recording surface 106 during track to track seek functions.

The control processor 144 and the servo control circuit 142 each communicate with an asynchronous serial port connector 160 for sending and receiving asynchronous, full-duplex serial port signals operating in excess of megabits per second (3 Mb/sec). The full-duplex serial port signals are used to provide communication and disc synchronization among the control processor 144, the servo control circuit 142, and an external dual serial port data acquisition interface assembly (not depicted).

The external dual serial port data acquisition interface assembly is used for characterizing the servo control circuit 142 of a data storage device 100. Additionally, the servo control circuit 142 provides high-speed, one way, synchronous signals to a synchronous serial port connector 162. The synchronous serial port connector 162 supports data collected from the drive at intervals of 1× or 2× for each of the servo sectors (not separately depicted) of the information tracks 120 of the data storage device 100 for characterization and operating point definition of the servo control circuit 142 by a personal computer (not depicted).

Figure 3:
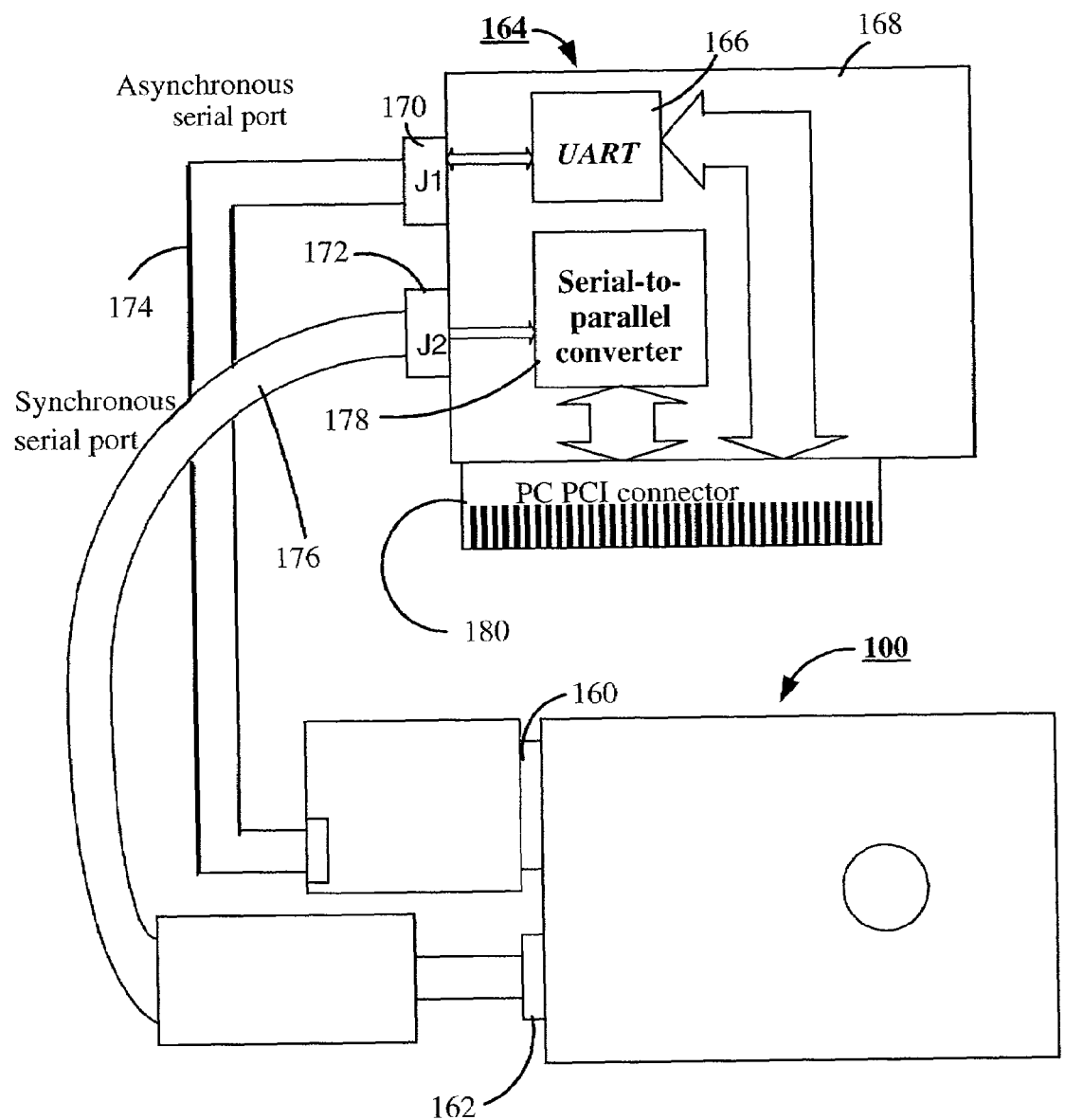
FIG. 3 is a functional block diagram of a dual serial port interface assembly used in characterizing the servo control circuit of the data storage device of FIG. 1.

FIG. 3 depicts a dual serial port data acquisition interface assembly 164 having a programmed universal asynchronous receiver/transmitter microchip (UART) 166 mounted on a printed circuit board 168. The programmed universal asynchronous receiver/transmitter microchip 166 controls a computer's interface (not separately depicted) when attached to the data storage device 100. Specifically, it provides the computer with an RS-232C data terminal equipment (DTE) interface so that it can "talk" to and exchange data with data storage device 100.

As part of this interface, the programmed universal asynchronous receiver/transmitter microchip 166 converts the bytes it receives from the computer along parallel circuits into a single serial bit stream for outbound transmission, converts the serial bit stream into the bytes that the computer handles on inbound transmissions, adds a parity bit (if the feature is selected or "turned on") on outbound transmissions and checks the parity of incoming bytes (if selected). Additionally, the programmed universal asynchronous receiver/transmitter microchip 166 discards the parity bit from inbound transmissions, adds start and stop delineators on outbound transmissions and strips them from inbound transmissions, and may handle other kinds of interrupts and device management that require coordinating the computer's speed of operation with device speeds.

FIG. 3 also depicts an asynchronous serial port connector 170 and a synchronous serial port connector 172, each attached to the printed circuit board 168. An asynchronous serial port cable 174 attaches to the asynchronous serial port connector 170 at a first end. At its distal end, the asynchronous serial port cable 174 attaches to the asynchronous serial port connector 160 of the data storage device 100. The asynchronous serial port cable 174 supports the communication between the programmed universal asynchronous receiver/transmitter microchip 166 and the application specific integrated circuit (ASIC) hardware-based servo controller ("servo engine") 148, as well as the control processor 144 (FIG. 2).

The synchronous serial port connector 172 is also depicted by FIG. 3 to be mounted to the printed circuit board 168 and attached to a first end of a synchronous serial port cable 176, which is likewise attached on its distal end to the data storage device 100 at synchronous serial port connector 162 of the data storage device 100. The synchronous serial port cable 176 supports communication between a serial-to-parallel converter 178 and the data storage device 100 through a high-speed, one way, and synchronous serial port utilized to collect data from the drive at intervals of 1× or 2× per servo sector.

There are two basic types of serial communications, synchronous and asynchronous. With synchronous communications, two devices initially synchronize themselves to each other, and then continually send characters to stay in synchronization. Even when data is not being sent, a constant flow of bits allows each device to know where the other is at any given time. That is, each character that is sent is either actual data or an idle character. Synchronous communications allows faster data transfer rates than asynchronous methods, because additional bits to mark the beginning and end of each data byte are not required. The serial ports on IBM compatible personal computers (PCs) are asynchronous devices and therefore only support asynchronous serial communications. As such the dual serial port data acquisition interface assembly 164 is provided to form an interface between a personal computer (not depicted) and the data storage device 100 for the purpose of characterizing the servo control circuit 142 of the data storage device 100.

Asynchronous means "no synchronization", and thus does not require sending and receiving idle characters. However, the beginning and end of each byte of data must be identified by start and stop bits. The start bit indicates when the data byte is about to begin and the stop bit signals when it ends. The requirement to send these additional two bits cause asynchronous communications to be slightly slower than synchronous communications; however, it has the advantage that the processor does not have to deal with the additional idle characters.

An asynchronous line that is idle is identified with a value of 1, (also called a mark state). By using this value to indicate that no data is currently being sent, the devices are able to distinguish between an idle state and a disconnected line. When a character is about to be transmitted, a start bit is sent. A start bit has a value of 0, (also called a space state). Thus, when the line switches from a value of 1 to a value of 0, the receiver is alerted that a data character is about to come down the line.

Besides the synchronization provided by the use of start and stop bits, an additional bit called a parity bit may be optionally transmitted along with the data. A parity bit affords a small amount of error checking, to help detect data corruption that might occur during transmission.

Both the serial-to-parallel converter 178 and the programmed universal asynchronous receiver/transmitter microchip 166 communicate with a personal computer (not depicted) via a personal computer peripheral component interconnect connector 180 (PC-PCI). Although many computer users think of the peripheral component interconnect standard as a way of laying out electrical wires, it is actually a complete set of specifications defining how different parts of a computer should interact, and specifically, how the command structures for various devices communicate with the computer.

Figure 4:
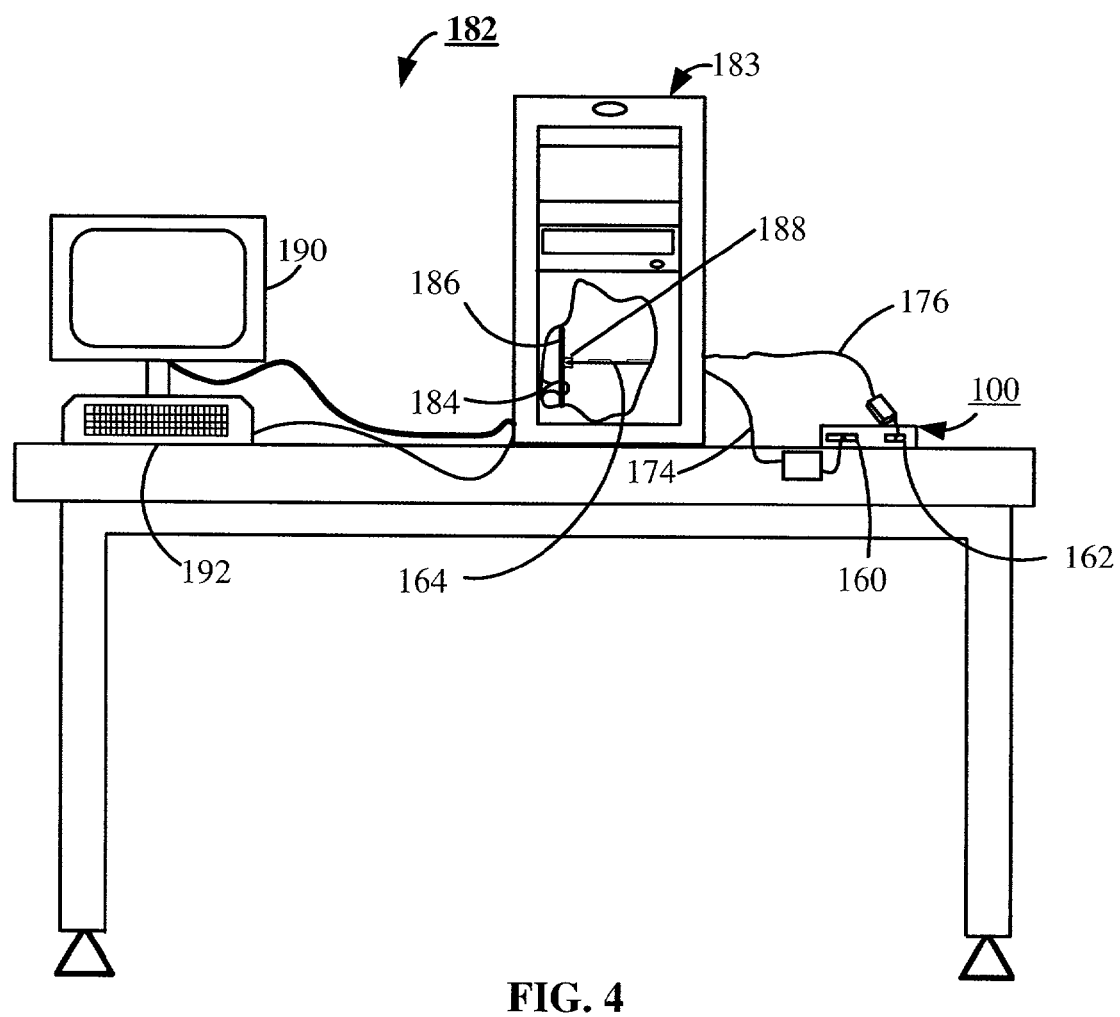
FIG. 4 is a servo control circuit performance measurement station for measuring an operating point of the servo control circuit of the data storage device of FIG. 1.

FIG. 4 depicts a servo control circuit performance measurement station 182 with a personal computer 183 supporting a chassis 184. The chassis 184 supports several assemblies of the servo control circuit performance measurement stations 182 including a motherboard 186 for processing measurement information collected from the data storage device 100.

The motherboard 186 includes a peripheral component interconnect (PCI) expansion slot 188, used to interface the personal computer 183 with the dual serial port data acquisition interface assembly 164. The dual serial port data acquisition interface assembly 164 is used in characterizing and defining the operating points of the servo control circuit 148 (FIG. 2). The dual serial port data acquisition interface assembly 164 communicates with the personal computer 183 through the peripheral component interconnect expansion slot 188.

The synchronous serial port cable 176 is attached on a first end to the dual serial port data acquisition interface assembly 164 via the synchronous serial port connector 172 (FIG. 3) and communicates on a distal end with the data storage device 100 via synchronous serial port connector 162. The asynchronous serial port cable 174 attached on a first end to the dual serial port data acquisition interface assembly 164 via the synchronous serial port connector 170 (FIG. 3) and communicates on a distal end with the data storage device 100 via synchronous serial port connector 160. FIG. 4 also depicts a monitor 190 communicating with the motherboard 186, and a keyboard 192 communicating with the motherboard.

It will be noted that for clarity of the disclosure, the present embodiment depicts that the data storage device 100, while undergoing a characterization of its servo control circuit 148, is external to the personal computer 183, and only one data storage device 100 is depicted connected to the personal computer 183. The structure selected for disclosure of the present invention was selected for ease of presentation and is but one of multiple configurations in which numerous changes would readily suggest themselves to those skilled in the art, without changing the functionality of the servo control circuit performance measurement stations 182. Nor does the structure selected for presentation impart limitations on the scope and spirit of the present invention.

Accordingly, the present invention is directed to a dual serial port data acquisition interface assembly, such as 164, for characterizing a servo control circuit, such as 148, of a data storage device, such as 100. The dual serial port data acquisition interface assembly comprises a printed circuit board, such as 168, for supporting components of the dual serial port assembly; a personal computer peripheral component interconnect connector, such as 188, communicating with the printed circuit board for passing data between a personal computer, such as 183, and the data storage device; a first serial port connector, such as 170, mounted on the printed circuit board for passing communication and synchronization data between the data storage device and personal computer; a second serial port connector, such as 172, mounted on the printed circuit board for passing a performance data of the servo control circuit from the data storage device to the personal computer; a programmed universal asynchronous receiver/transmitter microchip, such as 166, attached to the printed circuit board and communicating with the first serial port connector for controlling an interface between the personal computer and the data storage device; and a serial-to-parallel converter, such as 178, attached to the print circuit board and communicating with the second serial port connector for converting the performance data of the servo control circuit from a serial communication data string to a parallel communication data string for analysis by the personal computer.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An apparatus comprising:
    a programmed universal asynchronous receiver/transmitter microchip in communication with a first serial port to pass communication data between a host device and a test device; and
    a serial-to-parallel converter in communication with a second serial port to pass performance data from a control system of the test device to the host device and to convert said performance data from a serial communication data string to a parallel communication data string.

2. The apparatus of claim 1 in which the first serial port comprises a synchronous serial port.

3. The apparatus of claim 1 in which the second serial port comprises an asynchronous serial port.

4. The apparatus of claim 1 in which the programmed universal asynchronous receiver/transmitter microchip supports an asynchronous full-duplex serial communication protocol.

5. The apparatus of claim 1 in which the serial-to-parallel converter supports a high-speed, one-way, synchronous serial communication protocol used for collecting data from a servo control circuit of a data storage device.

6. The apparatus of claim 4 in which the programmed universal asynchronous receiver/transmitter microchip operates at a rate in excess of three mega-bits per second.

7. The apparatus of claim 5 in which the serial-to-parallel converter performs an acquisition of a real-time data from a servo sector of the data storage device.

8. An apparatus comprising:
    a host device analyzing performance data from a control system of a test device; and
    a dual serial port data acquisition interface assembly currently communicating with the test device via respective synchronous and asynchronous communication paths, wherein the synchronous communication path provides communication data from the test device, and wherein the asynchronous communication path provides the performance data from the control system.

9. The apparatus of claim 8 in which the test device comprises a data storage device and the control system comprises a servo control circuit of said data storage device.

10. The apparatus of claim 8 in which the dual serial port data acquisition interface assembly converts said performance data from a serial communication data string to a parallel communication data string.

11. The apparatus of claim 8 in which the dual serial port data acquisition interface assembly comprises:
    a first serial port configured to pass the communication and synchronization data between the test device and the host device;
    a second serial port configured to pass the performance data from the control system of the test device to the host device;
    a programmed universal asynchronous receiver/transmitter microchip configured to communicate with the first serial port to control an interface between the host device and the test device; and
    a serial-to-parallel converter configured to communicate with the second serial port to convert said performance data from a serial communication data string to a parallel communication data string.

12. An apparatus comprising:
a first serial port passing communication and synchronization data between a data storage device and a host device;
a second serial port passing performance data from a servo control circuit of the data storage device to the host device;
a programmed universal asynchronous receiver/transmitter microchip controlling an interface during passage of the communication and synchronization data; and
a serial-to-parallel converter converting said performance data from a serial communication data string to a parallel communication data string for analysis by the host device.

13. The apparatus of claim 12 in which the first serial port comprises a synchronous serial port.

14. The apparatus of claim 12 in which the second serial port comprises an asynchronous serial port.

15. The apparatus of claim 12 in which the programmed universal asynchronous receiver/transmitter microchip supports an asynchronous full-duplex serial communication protocol.

16. The apparatus of claim 12 in which the serial-to-parallel converter supports a high-speed, one-way, synchronous serial communication protocol used for collecting data from a servo control circuit of a data storage device.

17. The apparatus of claim 12 in which the programmed universal asynchronous receiver/transmitter microchip operates at a rate in excess of three mega-bits per second.

18. The apparatus of claim 12 in which the serial-to-parallel converter performs an acquisition of a real-time data from a servo sector of the data storage device.

* * * * *